Patented Nov. 7, 1950

2,529,232

UNITED STATES PATENT OFFICE 2,529,232

METHOD OF PRODUCING AROMATIZED BUTTER BY COOLING RICH CREAM, AND PRODUCT THEREOF

Alf Lennart Stigen, Stockholm, Sweden, assignor to Aktiebolaget Separator, Stockholm, Sweden, a corporation of Sweden No Drawing. Application August 17, 1948, Serial No. 44,794. In Sweden August 20, 1947

6 Claims. (Cl. 99—119)

It is known in the art to produce an aromatized butter by adding an aromatizing liquid to cream of high fat content and then to convert the cream into butter by cooling, as disclosed in Lindgren Patent No. 2,461,117, dated February 8, 1949, and Bang application Serial No. 573,142, filed January 16, 1945. Butter produced in this way has not, however, as good keeping qualities as ordinary inoculated butter produced by churning. In this respect, butter of the first-mentioned kind is inferior to ordinary butter although the content of bacteria is lower in the first-mentioned kind of butter.

The present invention relates to a process of making aromatized butter with good keeping qualities without having to use antioxidizing agents, which heretofore were regarded as necessary in order to give to butter, produced by cooling rich cream, those properties required when the butter has to be stored for some considerable time without thereby noticeably deteriorating. The invention is based upon the observation that the more rapid change occurring in butter produced by cooling rich cream is caused by the exceptionally large contact surface between the moisture droplets and the butter fat, and because the concentration of the hydrogen ions in the moisture has been reduced to a value which is favorable for the chemical processes causing the deterioration.

Between butter produced by cooling rich cream and ordinary butter there exists a difference in texture. In the latter, the droplets are worked into the butter during the churning operation. How finely the moisture is comminuted in the butter depends to a high extent on the degree of working. A butter of this kind contains moisture droplets of widely varying size. This is not the case with butter produced by cooling rich cream. In cream the milk serum constitutes the continuous phase which is fairly uniformly distributed in the cream. During the phase conversion of the rich cream, the continuous phase is divided into droplets of approximately the same size, practically all of which are smaller than the smallest moisture droplets in worked butter. This texture causes the contact surface between the moisture droplets and the butter fat to be many times larger in butter of this type than in ordinary butter.

According to the present invention, an aromatized butter with good keeping qualities is produced by admixing the aromatics in the form of a coarsely dispersed suspension. This suspension is introduced at such a stage in the process as to be included in the final product, that is, before, during or after the cooling of the rich cream. In this manner, a butter is obtained which contains moisture droplets of two different kinds. As before, a great number of small moisture droplets are produced, these being formed during the phase conversion of the uniformly distributed liquid phase of the cream. The liquid admixed in a coarsely dispersed form, which contains the butter aromatic, will on the contrary be in the form of moisture droplets of a size comparable with that found in ordinary butter. The small liquid droplets consist essentially of pure milk serum, since they have only to a small extent come into contact with the aromatizing liquid. The aromatized coarsely dispersed liquid droplets contain the major part of the added aromatics. The concentration of the aromatics is thus substantially higher than what it would have been if these droplets had been distributed in the whole liquid content of the butter. This fact does not, however, mean any substantial increase of the chemical changes occurring in the part of the butter which is nearest to the aromatized droplets. It has been found that the chemical changes no doubt increase with the concentration of the hydrogen ions, but after the concentration has reached a certain value, the rate of the change is not substantially increased.

In spite of the fact that the aromatics only occur in a small part of the liquid contained in the butter, this does not entail a reduction of its influence on the flavor, obviously because only a limited number of droplets come into contact with the gustatory papillas.

When the cooling is effected without any considerable agitation, it is possible to add the butter aromatics prior to the phase conversion or when the phase conversion has started; but in case a cooler with powerful agitation during the cooling is used, it may be necessary to add the aromatics after the major part of the cream has been converted into butter. The aromatics may then be added either in the cooler itself, at the outlet of the cooler, or in an apparatus connected to the cooler, after the entirely or partly converted cream has reached the desired final temperature.

An additional improvement may be obtained by the following procedure: First, an uninoculated butter is produced by cooling rich cream. This butter is stored. Before it is packaged, a liquid is worked into it which contains the butter aromatics and preferably also salt. In this manner a butter of the very best quality is obtained. Experience has shown that sweet butter, in which the hydrogen ion concentration of the moisture droplets corresponds to that of the milk, is not subject to chemical changes even during storing over long periods, provided that the cream from which the butter is produced is sterilized.

When the aromatic is mixed with the butter at the time it is packaged in pieces suitable for distribution, the butter fat will only for a short time be in contact with the moisture at a concentration of the hydrogen ions which is favorable for chemical transformation. Moreover, butter produced by cooling rich cream has a property which is important for this procedure.

As previously mentioned, ordinary butter must be worked with a view to finely comminuting the butter moisture. At the same time, butter oil is pressed out of the fat globules, which consists of unsaturated butter fats with a low solidification point. The amount of butter oil determines the consistency of the butter. At certain times of the year it is necessary to discontinue the working operation as soon as the moisture droplets have reached such a size that the butter does not give off free moisture on being stored. If the working were continued, a butter with too soft a consistency would be obtained. If the procedure described above were applied to ordinary worked butter, that is to say, if the aromatizing liquid were worked into it, the butter would of course acquire an unsuitable soft consistency.

Butter produced by cooling rich cream contains, at the phase conversion, relatively small amounts of butter oil which encloses the fat globules in the form of a continuous phase. Such butter may very well be stored without giving off moisture, since it contains only small liquid droplets and must often, in order to facilitate the packaging, be subjected to mechanical working which increases the continuous phase. This working may advantageously be carried out after the butter has been stored for a long time and in conjunction with the addition of aromatizing liquid. The working may be more intense and the admixed liquid may be more evenly distributed than is possible if the mechanical working of the butter is effected immediately after the phase conversion, because when the butter leaves the cooler, the crystallization of the butter fat in the fat globules has not proceeded as far as would be desirable. The fat globules still contain, besides crystals, large amounts of fluid butter fat which partly consists of the unsaturated fats and partly of crystallizing butter fat, dissolved in the unsaturated fats. If such a product is subjected to powerful mechanical working, which is necessary to finely comminute the liquid, there is a risk that in many cases a butter having too large a continuous phase is obtained, which will entail a soft consistency and a tendency to give off the butter oil at room temperature.

The method when continuously producing butter according to the invention will thus briefly be as follows.

Highly concentrated cream with a fat content approximately the same as that of the finished butter is obtained by centrifugal separation, suitably in two stages. This cream is passed in a continuous process to and through a cooling device in which, by cooling, the phase conversion is effected. During the passage through the cooling device the material is also subjected to a certain mechanical working which is necessary, partly, to overcome the flow resistance and, partly, for obtaining the desired texture and consistence of the finished butter. The aromatizing substance, which should be in liquid form, may be of the type indicated in our copending application Serial No. 573,142 is added to the flowing mass at such a stage of the process that the aromatizing substance will be coarsely dispersed in the finished butter. The stage of the process at which the said substance is to be added thus depends upon the degree of mechanical working to which the mass is subjected after the adding of the aromatizing substance, which degree, as said above, is determined among other factors by the desired texture of the finished butter. It should be observed that the size of the serum droplets formed at the phase conversion mainly depends upon how this is performed i. e. upon the cooling procedure whereas the size of the liquid droplets which are formed from the added aromatizing substance mainly depends upon the degree of mechanical working to which the mass is subjected after the addition of the aromatizing substance and to a certain extent also upon at which stage of the process the aromatizing substance is added. It is mainly this difference which explains that the aromatizing substance can be mixed with the butter in such a way that it forms coarse droplets in the butter. It will be evident from the above that the stage at which the aromatizing substance is to be added must be ascertained by trials in each particular case.

The finished butter is withdrawn from the cooling device in liquid state directly into suitable packages. If salted butter is desired, salt may suitably be added in a container arranged between the separator plant and the cooling device through which container the cream passes. The salt may also be added together with the aromatizing substance.

I claim:

1. In the process of producing an aromatized butter having good keeping qualities, in which butter fat contained in rich cream is converted from a dispersed phase to a continuous phase by cooling the cream, thereby forming from the continuous liquid phase of the cream moisture droplets of smaller size than the moisture droplets in butter obtained by working the butter fat to effect the phase conversion, and in which aromatics are introduced into the material being processed at such a stage of the process as to be included in the final product, the improvement which comprises mixing with said material the aromatics in droplets more coarsely dispersed and of a larger size than said first moisture droplets, whereby the final butter product contains finely dispersed and comminuted moisture droplets formed, in said phase conversion, from the continuous liquid phase of the cream, and also contains larger and more coarsely dispersed moisture droplets which, after the phase conversion, include the major part of the aromatics.

2. The improvement according to claim 1, in which the aromatics are so mixed after the phase conversion and after the product has attained its final temperature as a result of said cooling.

3. The improvement according to claim 1, in which the aromatics are so mixed by mechanical working of the butter after it has been stored following said phase conversion.

4. A butter product containing aromatics and obtained by cooling rich cream to effect the phase conversion into butter, said product being characterized by its inclusion of finely dispersed and comminuted moisture droplets formed from the continuous liquid phase of the cream, and also by its inclusion of moisture droplets of larger size and more coarsely dispersed than said first droplets and containing the major part of the aromatics.

5. The improvement according to claim 1, in which the aromatics are so mixed in droplets of the size of the moisture droplets in butter obtained by working the butter fat to obtain the phase conversion.

6. The process of producing aromatized butter having good keeping qualities, which comprises concentrating cream to a fat content substantially equal to that desired in the final butter, rapidly cooling the concentrated cream to effect a phase conversion in which the fat is converted from a dispersed phase to a continuous phase, whereby the moisture droplets in the resulting butter are of smaller and more uniform size than the moisture droplets in butter produced by working the fat to effect the phase conversion, and mixing with the material, after said phase conversion, aromatic droplets more coarsely dispersed and of larger size than said first moisture droplets, whereby the final butter product contains finely dispersed and comminuted moisture droplets formed, in said phase conversion, from the continuous liquid phase of the cream, and also contains larger and more coarsely dispersed moisture droplets which, after the phase conversion, include the major part of the aromatics.

ALF LENNART STIGEN.

REFERENCES CITED

The following references are of record in the file of this patent:

UNITED STATES PATENTS

| Number | Name | Date |
| --- | --- | --- |
| 484,916 | De Laval | Oct. 25, 1892 |
| 983,854 | Yeoman | Feb. 7, 1911 |
| 1,004,891 | Moller | Oct. 3, 1911 |
| 1,216,674 | Erslev | Feb. 20, 1917 |
| 1,232,016 | Erslev | July 3, 1917 |
| 1,977,927 | Wendt | Oct. 23, 1934 |
| 2,168,376 | Van der Meulen | Aug. 8, 1939 |
| 2,196,239 | Werkman | Apr. 9, 1940 |

OTHER REFERENCES

"Treatment and Transformation of Milk, Improvement of Quality. The Aroma of Butter," by W. Mohr, J. Dairy Service, November 1938, pp. 288–289.

"Diacetyl in Butter," by W. L. Davies, pages 346–348, October 1933, ed. of "Food Manufacture."